United States Patent [19]

Campbell

[11] Patent Number: 5,545,985
[45] Date of Patent: Aug. 13, 1996

[54] MAGNETORESISTIVE POSITION SENSOR INCLUDING AN ENCODER WHEREIN THE MAGNETIZATION EXTENDS GREATER THAN 0.5 TIMES THE POLE PITCH BELOW THE SURFACE

[76] Inventor: Peter Campbell, 7300 W. Camino Real, Suite 131, Boca Raton, Fla. 33433

[21] Appl. No.: 214,142

[22] Filed: Mar. 16, 1994

[51] Int. Cl.⁶ .............................. G01B 7/14; G01B 7/30
[52] U.S. Cl. .................................. 324/207.21; 324/207.25
[58] Field of Search ........................... 324/207.21, 252, 324/207.25, 207.2, 251, 207.12, 207.22, 207.24; 338/32 R, 32 H

[56] References Cited

U.S. PATENT DOCUMENTS

| | | | |
|---|---|---|---|
| 4,039,936 | 8/1977 | Jones et al. | 324/34 D |
| 4,403,187 | 9/1983 | Takahashi et al. | 324/208 |
| 4,418,372 | 11/1983 | Hayashida et al. | 360/113 |
| 4,628,259 | 12/1986 | Takahashi et al. | 324/208 |
| 4,639,807 | 1/1987 | Sekizawa et al. | 360/113 |
| 4,731,580 | 3/1988 | Indo | 324/208 |
| 4,853,631 | 8/1989 | Carmen | 324/208 |
| 5,243,280 | 9/1993 | Kusumi | 324/207.21 |
| 5,325,056 | 6/1994 | Shonowaki et al. | 324/207.21 |

FOREIGN PATENT DOCUMENTS

3302319  12/1988  Japan.

*Primary Examiner*—Sandra L. O'Shea
*Assistant Examiner*—Roger Phillips
*Attorney, Agent, or Firm*—John H. Crozier

[57] ABSTRACT

In a preferred embodiment, a magnetoresistive (MR) position sensor, including: a rotatable cylindrical encoder wheel having a plurality of alternating N and S magnetic poles spaced a constant pole pitch around the circumferential surface of the encoder wheel, adjacent ones of the N and S poles having interfacing edges parallel to the axis of rotation of the encoder wheel; a first MR sensing array disposed on an insulative substrate in proximity to the circumferential surface of the encoder wheel, such as to sense rotating magnetic fields produced by the N and S poles as they pass the first MR sensing array as the encoder wheel rotates, the first MR sensing array including at least a first section comprising at least two legs extending parallel to the interfacing edges, the at least two legs being joined in series so as to form a serpentine shape; apparatus to apply a constant DC voltage across terminal ends of the serpentine shape.

5 Claims, 9 Drawing Sheets

DISPLACEMENT 5,545,985

MAGNETORESISTIVE POSITION SENSOR INCLUDING AN ENCODER WHEREIN THE MAGNETIZATION EXTENDS GREATER THAN 0.5 TIMES THE POLE PITCH BELOW THE SURFACE

BACKGROUND OF THE INVENTION

1. Field of the Invention.

The present invention relates generally to a magnetic position encoder system for sensing the angular position of a moving member, and relates more particularly to a magnetic rotary encoder system having a magnetic sensor and an encoder wheel wherein the magnetic sensor includes an array of magnetoresistive (MR) elements arranged such as to produce one or more channels of incremental signals which are related directly to the angular position of recorded information on one or more tracks on the encoder wheel. Each track of the information is recorded as a magnetic pole array on the encoder wheel, such that as the wheel attached to the moving member rotates, the orientation of the resulting magnetic field at each MR element changes in such a way as to modify the resistance of the element.

2. Background Art

It is well known in the art that when an MR element made of material such as permalloy is placed in a magnetic field, the electrical resistance of the MR element changes depending upon the strength of the magnetic field. Thus, when such an MR element is used to sense magnetic information recorded on a magnetic medium, the recorded magnetic information can be reliably sensed even when the relative velocity between the magnetic medium and the MR element is zero. A transducer apparatus comprising an array of MR elements and using the principle of the detection of the resistance of these MR elements in the presence of a magnetic field to determine the relative displacement of the medium carrying the magnetic information is disclosed, for example, in U.S. Pat. Nos. 4,039,936, 4,403,187, 4,418,372, 4,628,259, 4,639,807, 4,731,580, and 4,853,631.

It is also known in the art, and specifically from U.S. Pat. No. 4,039,936 issued Aug. 2, 1977 to A. L. Jones et al., that a change in a voltage signal can be derived from the changes in resistance in the MR elements if the MR elements are grouped in sections and if each section is symmetrically disposed at a pitch which is related to the pitch of the magnetic pole array of the corresponding track on the encoder wheel. Each of these sections may be a group of two or more MR elements, including serpentine shapes which are used to increase the total length and resistance of the transducer. A significant limitation of the magnetic field system described in U.S. Pat. No. 4,039,936 is that relative motion is established between a single permanent magnet pole to which the MR element array is attached and a toothed rack made of a soft ferromagnetic material; each section of the MR elements is symmetrically disposed at the half-pitch of the teeth in the rack and parallel with the tooth edges. The resolution of angular position using this scheme is limited by the need of each MR element to clearly discriminate between the gaps from the permanent magnet to a tooth and from the permanent magnet to a slot in the rack; the pitch of the teeth in the rack needs to be large compared to the separation between the teeth and the MR element array for this to be achieved. This limitation is aggravated by the almost uni-directional orientation of the magnetic field which is perpendicular to the plane of the MR elements; the maximum field strength is experienced in any one of the MR elements when it is in the center of a gap between the permanent magnet and a tooth, whereas the minimum field strength is experienced when an MR element is in the center of a gap between the permanent magnet and a slot in the rack.

It is well known in the art that when an MR element made of material such as permalloy is placed with its plane perpendicular to a magnetic field, the greatest change in electrical resistance of the MR element is achieved when the minimum field experienced by the MR element is of insufficient strength to penetrate the MR element while the maximum field experienced by the MR element is of sufficient strength to saturate all of the MR element material. The greatest possible change in electrical resistance of an MR element is only realized when the magnetic field fully saturates the MR material in one position and when it is completely excluded from the MR material in another position. Using an almost uni-directional field from a permanent magnet into a toothed rack such as that described in U.S. Pat. No. 4,039,936, this requirement imposes a serious limitation on the minimum pitch that can be employed for the teeth in that rack, and hence a limitation on the resolution of angular position that can be achieved by a magnetic position encoder using this principle.

Accordingly, it is a primary object of the present invention to provide a magnetic sensor comprising an array of MR elements and an encoder wheel which carries one or more magnetic pole arrays, such that as the wheel rotates relative to the sensor, the orientation of the magnetic field experienced by an MR element causes a sufficient change in the resistance of that MR element to provide an electrical signal from which the incremental angular rotation of the wheel can be deduced.

It is a further object of the present invention to provide an MR element and an encoder wheel which carries a magnetic pole array, such that as the wheel rotates relative to the element, it is the orientation of a rotating magnetic field experienced by the MR element rather than the magnitude of an almost uni-directional magnetic field which causes a change in the electrical resistance of the MR element.

It is an additional object of the present invention to provide a magnetic sensor comprising an array of MR elements and an encoder wheel which carries one or more magnetic pole arrays, which use the principle of rotating fields experienced by the MR elements as the wheel rotates to produce a much greater resolution of angular position compared to previous schemes in the prior art which employ almost uni-directional fields of varying magnitude.

It is another object of this invention to provide a magnetic encoder which produces a high resolution of the angular position of an encoder wheel, in one or more incremental channels which have a pre-determined and fixed phase relationship between them, and an optional index marker channel.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a magnetoresistive (MR) position sensor, comprising: a rotatable cylindrical encoder wheel having a plurality of alternating N and S magnetic poles spaced a constant pole pitch around the circumferential surface of said encoder wheel, adjacent ones of said N and S poles having interfacing edges parallel to the axis of rotation of said encoder wheel; a first MR sensing array disposed on an insulative substrate in proximity to said circumferential surface of said encoder wheel, such as to sense rotating magnetic fields produced by said N and S poles as they pass said first MR sensing array as said encoder wheel rotates, said first MR sensing array including at least a first section comprising at least two legs extending parallel to said interfacing edges, said at least two legs being joined in series so as to form a serpentine shape; means to apply a constant DC voltage across terminal ends of said serpentine shape.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIGS. 1b–d illustrate output waveforms from the magnetic position encoder of FIG. 1a.

FIGS. 8b–d illustrate waveforms produced by the embodiment of the present invention shown on FIG. 8a.

FIG. 9 schematically illustrates circuitry that may be employed with the embodiment of the present invention shown on FIG. 8a.

FIGS. 10b–f illustrate waveforms produced by the embodiment of the present invention shown on FIG. 10a.

FIGS. 13b–f illustrate waveforms produced by the embodiment of the invention shown on FIG. 13a.

FIG. 14 schematically illustrates circuitry that may be employed with the embodiment of the present invention shown on FIG. 13a.

DETAILED DESCRIPTION OF THE PREFERRED EMBODIMENTS

Figure 1A:
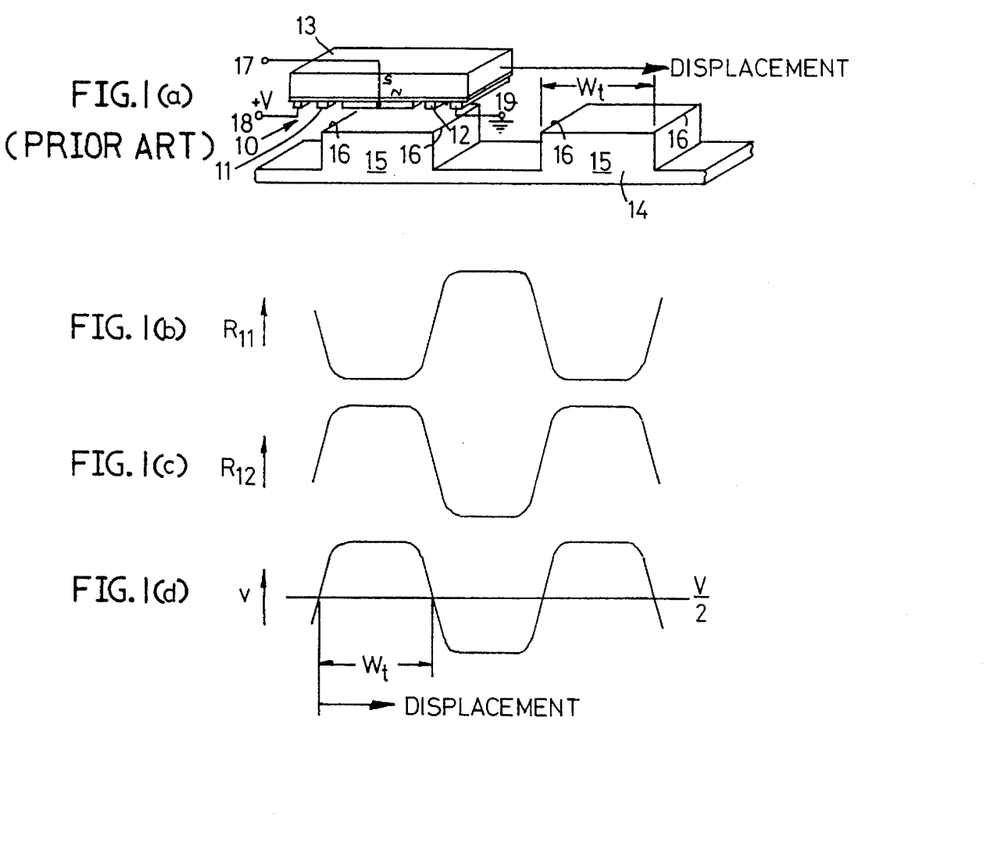
FIG. 1a is a fragmentary, schematic/isometric view of a prior art type of magnetic position encoder.

Referring to FIG. 1a, a magnetic position encoder configuration from the prior art is shown. A magnetoresistive (MR) array 10 has first and second sections 11 and 12, separated by a tooth width $W_t$, or one-half the tooth pitch. The MR array 10 is secured to the face of a permanent magnet 13, which provides magnetic flux that passes through the MR array in a direction almost perpendicular to the plane of the MR elements in the sections 11 and 12, and thence into a toothed rack 14 having teeth 15. The MR elements in the sections and 12 are aligned parallel to the edges 16 of the teeth. The distance between the edges 16 of each tooth 15 is one-half of the tooth pitch $W_t$, a condition which provides symmetry in the output signal waveforms.

If the MR elements in the array 10 are made from permalloy, the electrical resistance of one such element will drop by 2.0±0.5% when all of the material comprising that element is penetrated by magnetic flux of sufficient strength to saturate that material. When the MR array and permanent magnet assembly moves at a constant height above the rack in a direction perpendicular to tooth edges, the relative displacement causes the total resistances of the MR sections 11 and 12 to vary as shown in FIG. 1b and c respectively. The two sections 11 and 12 of the MR array 10 are connected electrically in series, their interconnection forming a common terminal 17. If a constant d.c. voltage +V is applied across the array at its terminals 18 and 19, then the relative displacement causes the voltage v at common terminal 17 to vary as shown in FIG. 1d.

Figure 2:
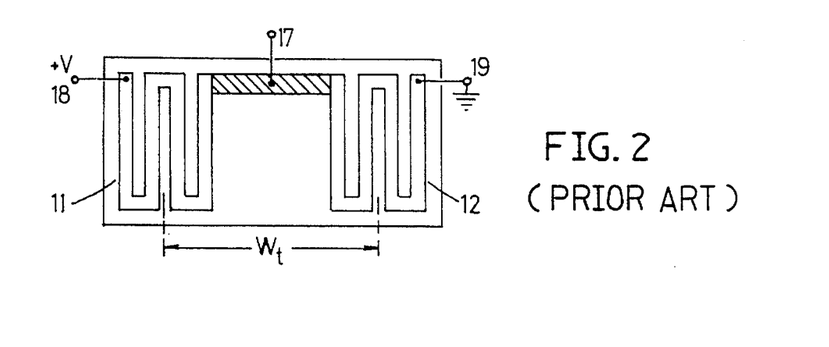
FIG. 2 is a prior art magnetoresistive (MR) array which can be employed in the magnetic position encoder of FIG. 1.

One MR array from the prior art that can be used in the magnetic position encoder of FIG. 1 is shown in FIG. 2, and this layout includes a serpentine shape in which each of the two sections 11 and 12 comprise four MR elements in series. As shown in FIG. 2, it is the distance between the centers of these two sections which is set to be one-half the tooth pitch $W_t$. It is a known limitation of the configuration of FIG. 1a that, whereas the distance between the two MR sections can be reduced until there is only a minimal spacing between the closest adjacent elements of each section, the pitch of the teeth in the rack can only be reduced so far as the magnetic field fully saturates the MR element material when the element is directly above a tooth while the magnetic field is completely excluded from the MR element material when the element is equi-distant between two adjacent teeth. This situation is aggravated because an almost uni-directional magnetic field is used, whose orientation is perpendicular to the plane of the MR elements. The limitation on the reduction of the tooth pitch in the rack, and the consequent limitation on the resolution of angular position that can be achieved by a magnetic position encoder using this principle, can be alleviated by combining the MR array with an encoder wheel which carries a magnetic pole array, and by designing the sections of that MR array in such a way that the variation of an almost uni-directional magnetic field is not required for satisfactory operation of the encoder.

In a magnetic encoder, the direction of electrical current in an MR element is always transverse to the direction of the magnetic field applied to that element, and when the element is made from permalloy, its electrical resistance will change by around −2.0% when the field is strong enough to saturate the magnetization M of the element. However, the internal field $H_i$ within the MR element will be somewhat less than the externally applied magnetic field $H_o$, depending upon a demagnetizing factor N via $$H_i = H_o - NM \tag{1}$$

The value of the demagnetizing factor depends upon the shape of the element and the orientation of the applied field to it, and lies within the positive range zero to unity. For example, it is well known that for an applied field which is perpendicular to the plane of a large, thin plate, the demagnetizing factor approaches a value of unity.

Figure 3A:
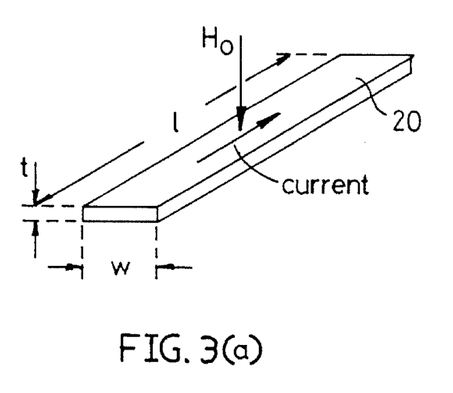
FIGS. 3a and 3b illustrate magnetic fields acting on a leg of an MR element.

Referring to FIG. 3a, a typical MR element 20 will have a length l in the direction of current flow that is several orders of magnitude greater than its width w, which in turn is several orders of magnitude greater than its thickness t. This satisfies the condition of $N \cong 1$ for an applied field $H_o$ perpendicular to the plane l×w, in which case $$H_i = H_o - M \quad (2)$$

The meaning of this is that, for the field orientation shown in FIG. 3a, the applied field $H_o$ must reach a strength of at least +M for it to pass into the material of the MR element. For $H_o$ less than +M, the applied field will effectively be excluded from the element, and will be diverted through the air surrounding it. For permalloy, M has an approximate value of 860 kA/m, which if used in a configuration which employs an approximately uni-directional field such as FIG. 1a, requires that a relatively large tooth pitch be used in the rack to achieve a sufficient modulation from the peak applied field of $H_o > +M$.

A significant improvement offered in the present invention is that the applied magnetic field is designed to be excluded from the MR element when it is oriented perpendicular to the plane of the element as shown in FIG. 3a. Therefore, it is not required that the permanent magnet field source provide an applied field $H_o$ that is greater than the characteristic M of the material, but rather that a peak field $H_o$ that is much less than M be used. With this advantage, a magnetic pole array can be employed which does not limit the resolution of the encoder, as by way of a minimum tooth pitch in a rack.

In the present invention, the applied magnetic field is not constrained to modulate approximately in a unique direction, but should rotate in a plane that is perpendicular to both the plane and the length of the MR element. Two important positions from such rotation are shown in FIG. 3a and b. It is well known that for an applied field which is parallel to the plane of a large, thin plate, the demagnetizing factor approaches a value of zero. Referring to the MR element 20 in FIG. 3b in which the applied field $H_o$ is parallel to the plane l×w, this satisfies the condition of $N \cong 0$, in which case $$H_i = H_o \quad (3)$$

Figure 3B:
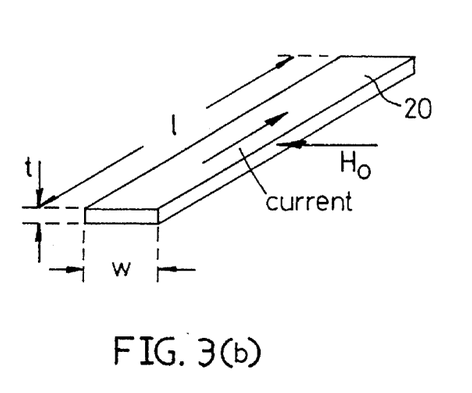

The meaning of this is that, for the field orientation shown in FIG. 3b, the applied field $H_o$ is allowed to pass unimpeded into the material of the MR element. At this orientation, a very small applied field will saturate the MR element, a value of around 4 kA/m being typically used in the case of the permalloy material. A comparison between this value of 4 kA/m for a rotating field and the value of 860 kA/m for a unidirectional field demonstrates an advantage of the present invention, which is used to significantly increase the resolution of the encoder.

It is apparent from the foregoing discussion that the effectiveness of the present invention depends on how nearly $N \cong 1$ and $N \cong 0$ for the field orientations shown in FIG. 3a and b respectively, which in turn depend upon how closely the element resembles a large, thin plate with w>>t. A typical magnetic sensor is manufactured by sputtering a thin layer of magnetoresistive alloy such as permalloy on an insulative substrate such as glass. The array of MR elements and their interconnections are then photo-etched from the metallic layer. Using current process technology, the thickness of the sputtered layer t may be up to 0.0002 mm, whereas the minimum element width w that can be photo-etched is around 0.015 mm. Consequently, the critical ratio w/t may be as small as 75, which is not large enough to ensure that the element appears as a truly thin plate. Better performance would be achieved either by reducing t, though the consequent reduction in metal makes the device less rugged, or by increasing w, which has the often undesirable effect of reducing the element's resistance and raising the current drawn by the sensor. A preferred solution is to use the serpentine shape for each section of MR elements, which has the obvious benefits of increasing the total resistance while maintaining a rugged construction.

Figure 4:
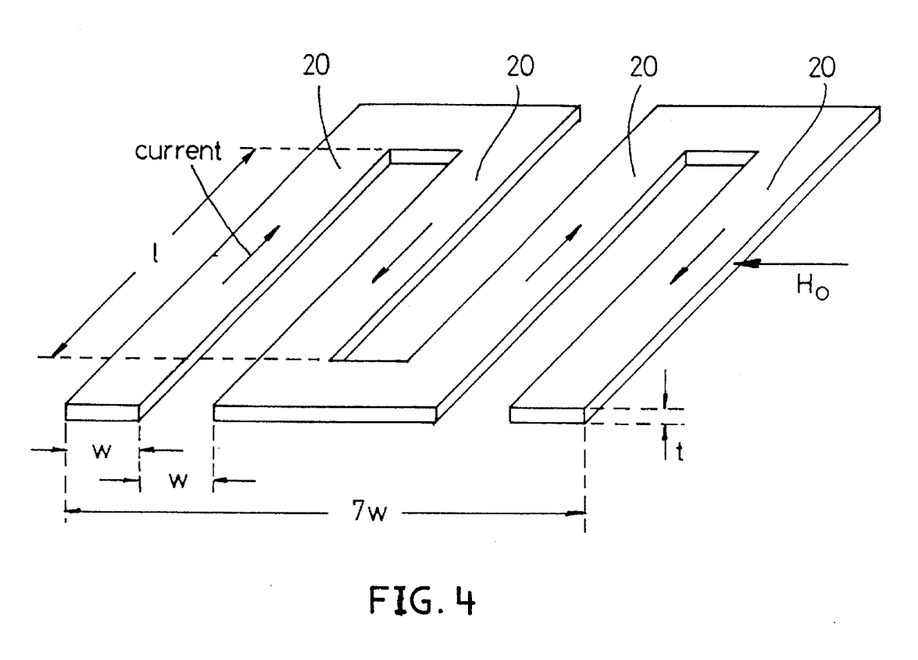
FIG. 4 illustrates a magnetic field acting on an MR element.

A further yet essential benefit to the present invention is the effective increase in overall width of the section that is obtained by combining multiple MR elements in series into a section. One particular embodiment shown in FIG. 4 combines four MR elements 20, each of width w, spaced apart also a distance w. When the applied field is oriented parallel to the plane of the section as shown in FIG. 4, the apparent width of the section is 7w, the critical ratio is now 7w/t, and using the previous values, this may now only be as small as 525, which is certainly large enough for the section to appear to the applied field as a thin plate. Only a very small applied field across the plane will be needed to saturate a section of MR elements.

Figure 5:
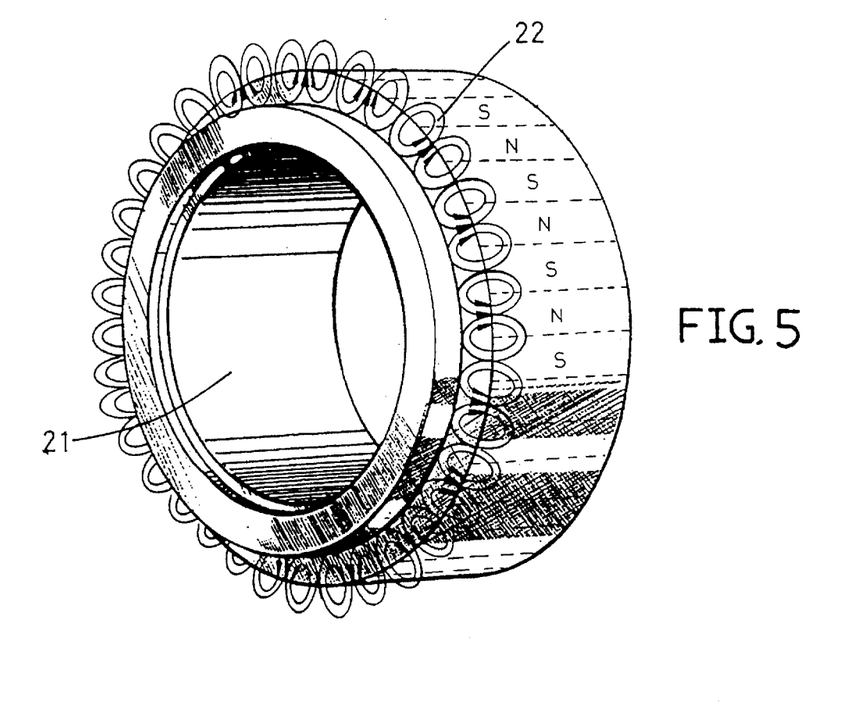
FIG. 5 is an isometric view of a magnetized encoder wheel for use in the present invention.
Figure 6:
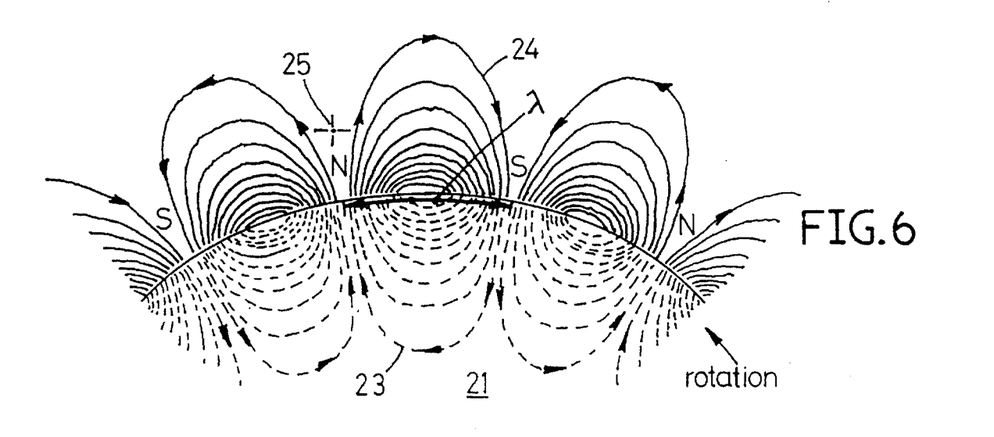
FIG. 6 is a fragmentary, side elevational view of the encoder wheel of FIG. 5.

FIG. 5 shows an encoder wheel 21 with a magnetic pole array 22, which has been recorded as a track on its cylindrical outer surface. FIG. 6 is a section through this encoder wheel perpendicular to its axis of rotation, which shows the magnetic flux lines 23 of the pole array that is magnetized within the material and the resulting flux lines 24 that exist just outside the surface of the wheel. In this array, the adjacent North (N) and South (S) poles are spaced at a constant pitch λ around the wheel's circumference. At any fixed position 25 in space just beyond the wheel's outer surface, as the wheel rotates, the direction of the magnetic flux at that position will rotate in the manner required for this invention. It should be understood that for a rotation of the wheel's outer surface by a distance 2λ, the direction of the flux at position 25 will rotate by 360°.

A further requirement for this invention is that the magnitude of the magnetic field at a position just beyond the outer surface of the wheel be approximately constant regardless of its orientation and be well within the range 4 to 860 kA/m. These conditions are most closely realized if the encoder wheel 21, or at least its outer surface region, are made from a homogeneous, isotropic permanent magnet material having a relatively low coercivity of around 80 kA/m. These characteristics are most conveniently achieved when the encoder wheel, or at least the region extending a distance greater than ½λ below the wheel's outer surface, is injection-molded from a ceramic ferrite permanent magnet material. The aforementioned requirements of a rotating field with an approximately constant magnitude are met at any position beyond the wheel's outer surface which is at a distance no greater than 0.4×λ from that surface. The reason for this is that the approximation of constant magnitude breaks down at greater distances away from the field source in the wheel, where the resulting field is much weaker. For example, for an MR element to function in the manner prescribed by this invention, if the pole pitch λ is chosen to be 0.75 mm, then the MR element should optimally be located at a position 0.30 mm (or less) beyond the surface of the encoder wheel.

Figure 7A:
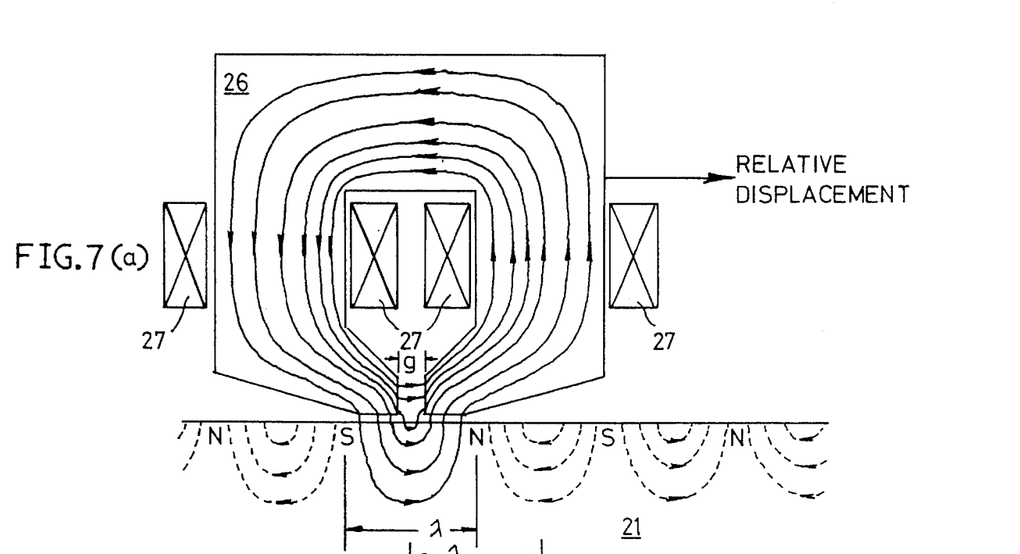
FIGS. 7a–b schematically illustrate the process of magnetizing the encoder wheel of FIG. 5.
Figure 7B:
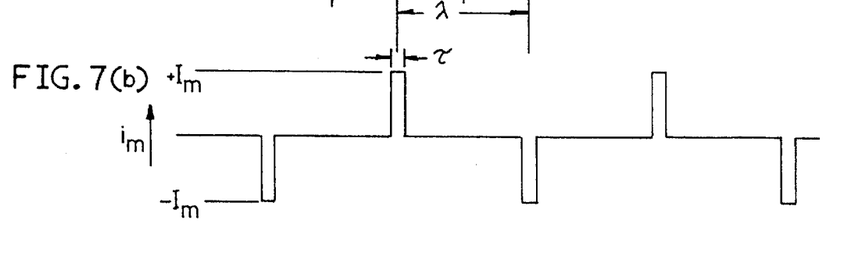

The preferred method of magnetizing the pole array will now be described, which establishes the magnetic flux lines 23 within the surface region of the encoder wheel made from a homogeneous, isotropic permanent magnet material in the pattern required and prescribed by this invention. The section that was shown in FIG. 6 is linearized for clarity in the subsequent Figures, though it is understood that this may always be a curved section of a wheel. FIG. 7a shows the encoder wheel 21 being magnetized by a recording head 26, the design of which is well known in the art. The recording head is made of ferromagnetic material and typically carries two coils 27 which are connected electrically in series to a power supply. During the magnetization process, the recording head is placed in close proximity to the encoder wheel as illustrated in FIG. 7a, and may even be lightly touching the wheel's surface. The design of the recording head should approximately match the pitch $\lambda$ of the pole array to be magnetized on the wheel, and specifically the gap g in the recording head should be a fraction of $\lambda$, typically in the range one quarter to one half of $\lambda$. Relative motion is established between the recording head and the encoder wheel, usually by rotating the wheel, though FIG. 7 illustrates a relative displacement of the head. A control circuit is used to draw current $i_m$ from the power supply into the recording head in the manner prescribed in FIG. 7b. This current waveform comprises a sequence of pulses having equal durations $\tau$ but alternating magnitudes $+I_m$ and $-I_m$. To magnetize a magnetic pole array which establishes flux lines as prescribed for the correct functioning of this invention, it is necessary that the current pulses be of sufficient magnitude $|I_m|$ to saturate the permanent magnet material of the wheel, that they be of a duration that is no greater than about 15% of the desired pole pitch (i.e. $\tau \cong 0.15\lambda$), and that the period of the pulses be equal to the desired pole pitch $\lambda$.

Figure 8A:
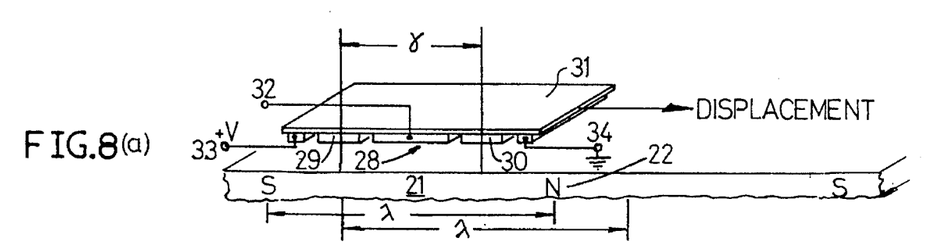
FIG. 8a is a fragmentary, schematic/isometric view showing a magnetoresistive position encoder according to one embodiment of the present invention.

Referring to FIG. 8a, a magnetic position encoder configuration of this invention is shown. A magnetoresistive (MR) array 28 has first and second sections 29 and 30, separated by a distance $\gamma$, and the entire array is secured to an insulative substrate 31 such as glass. An encoder wheel 21 has been recorded with a magnetic pole array 22 in which adjacent North (N) and South (S) poles are spaced at a constant pitch $\lambda$. One particular embodiment is for each of the sections 29 and 30 to combine four MR elements, as was shown in FIG. 4. The effective width of each section is very much greater than the sputtered thickness of the elements, which according to this invention provides that a rotating applied magnetic field of appropriate magnitude may fully saturate the section in one orientation and yet be fully excluded from the section in another orientation which is 90° disposed to the first orientation. All of the MR elements in each of the sections are at a fixed distance above the surface of the wheel which is no greater than 0.4×$\lambda$, which according to this invention provides that each of the MR elements experiences a rotating applied magnetic field of approximately constant magnitude as the wheel rotates.

Figure 8B:
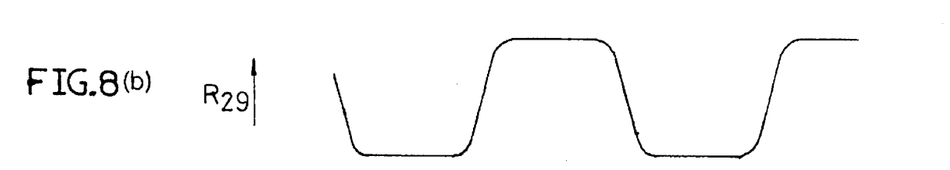
Figure 8C:
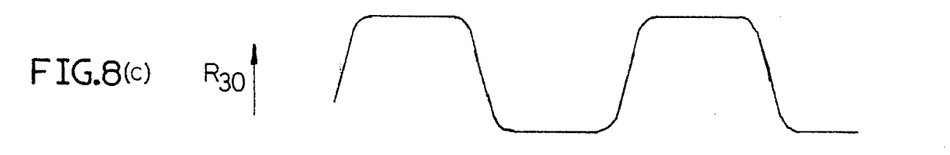
Figure 8D:
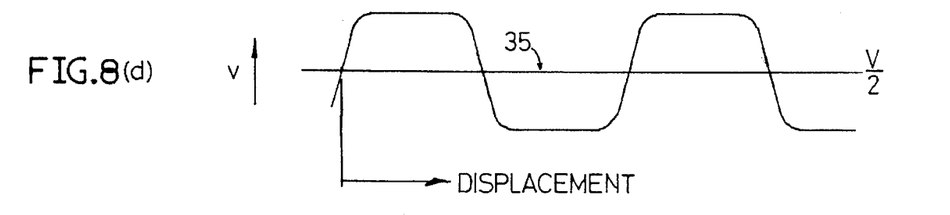

In the embodiment shown in FIG. 8a, the pitch of the sections $\gamma$ is one half of the pole pitch $\lambda$. When the MR array moves at a constant height above the encoder wheel in a direction perpendicular to pole edges, the relative displacement causes the total resistances of the MR sections 29 and 30 to vary as shown in FIG. 8b and c respectively. The two sections 29 and 30 of the MR array 28 are connected electrically in series, their interconnection forming a common terminal 32. If a constant d.c. voltage +V is applied across the array at its terminals 33 and 34, then the relative displacement causes the voltage at common terminal 32 to vary symmetrically about a selected reference value 35 which is approximately equal to ½V as shown in FIG. 8d. It should be recognized that this output voltage waveform is similar in form to that in FIG. 1d, which shows that the magnetic position encoder of this invention performs the same function as that cited from the prior art, but without the limitation imposed by the toothed rack upon the resolution. The limit to the resolution that can be achieved with the present invention is determined by the minimum height at which it is practical to mount the MR array above the encoder wheel, which might include an allowance for a protective covering layer over the MR array. For example, if the MR array can be mounted at a height of 0.050 mm above the surface of the encoder wheel, then the maximum resolution of this encoder is derived from a magnetic pole array with a pitch of $\lambda$=0.125 mm. While FIG. 8a shows one possible embodiment, it should be realized that this invention functions in exactly the same manner if the pitch of the sections $\gamma$ is $$\gamma = \left( \frac{2n+1}{2} \right) \lambda \tag{4}$$

where n is zero or any suitable positive integer.

Figure 9:
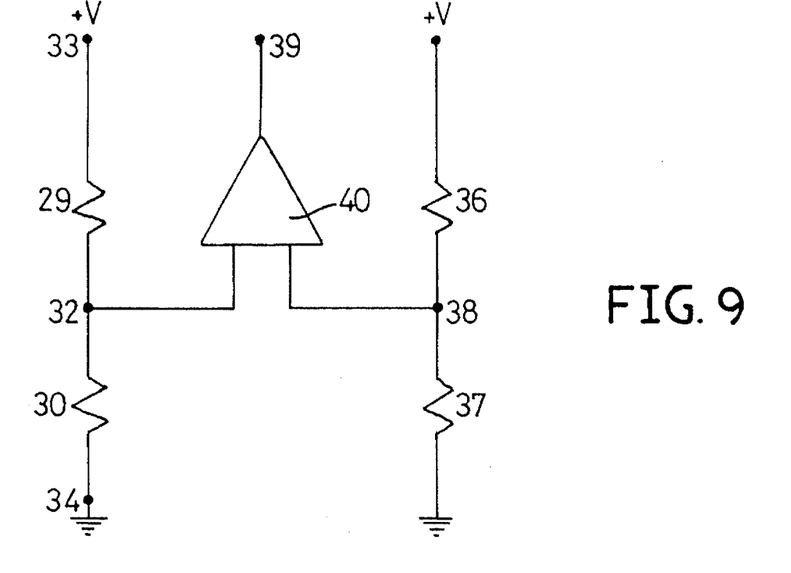

FIG. 9 shows a suitable signal sensing and conditioning circuit for producing an output voltage signal at its output terminal 39 each time a magnetic pole is sensed by the MR array. This circuit employs a comparator module 40 including an operational amplifier which has a pair of signal input terminals: one input terminal is connected to the junction 38 of two equal resistors 36 and 37 which are connected electrically in series, and the other input terminal is connected to the common terminal 32 between the two MR sections 29 and 30 of the MR array in accordance with the invention. Resistors 36 and 37 are each of an approximate value of the corresponding MR sections so that the excursions of the comparator output signal at terminal 39 are approximately equal from the selected reference value 35 of FIG. 8d. The comparator output signal can then be connected to suitable threshold circuits to provide signals such as square waves which are indicative of the detection by the MR array of pole edges in the magnetic pole array.

Figure 10A:
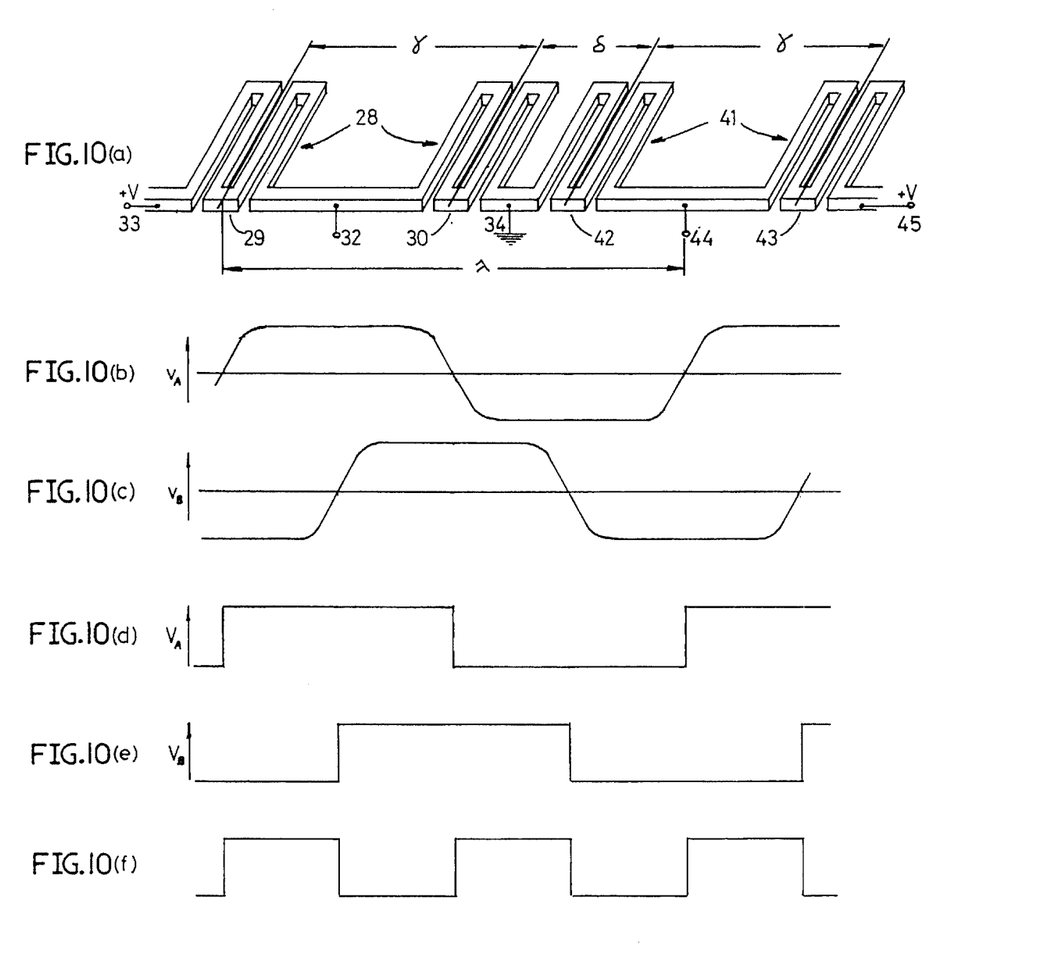
FIG. 10a is a fragmentary, schematic/isometric view showing an MR sensor according to an alternative embodiment of the present invention.

Many practical position encoders are required to output more than one square wave signal channel, and it is common to combine two such incremental channels which have a fixed phase displacement with respect to each other as a means to increase the resolution of the encoder. This can be achieved very economically in the magnetic position encoder of this invention by simply securing additional and similar MR arrays to a single insulative substrate, both MR arrays interacting with the same magnetic pole array of the encoder wheel. FIG. 10a shows the original MR array 28, though the substrate 31 and the pole array 22 have been omitted for clarity but whose positions should be understood from FIG. 8a. A second MR array 41 has first and second sections 42 and 43, separated by a distance $\gamma$.

One particular embodiment is for each of the sections 29, 30, 42 and 43 to combine four MR elements as was shown in FIG. 4, and all of the MR elements in each of the sections are at a fixed distance above the surface of the wheel which is no greater than 0.4×$\lambda$. When the MR arrays 28 and 41 move at a constant height above the encoder wheel in a direction perpendicular to the pole edges, the relative displacement causes the output voltage waveform $v_A$ at the common terminal 32 to vary as shown in FIG. 8b and in FIG. 10b. The first section 42 of the second MR array is separated by a distance $\delta$ from the second section 30 of the first MR array, which in the embodiment shown in FIG. 10a is one quarter of the pole pitch $\lambda$. If the same constant d.c. voltage +V is applied across the second array at its terminals 45 and 34, then the relative displacement causes the voltage $v_B$ at common terminal 44 to vary as shown in FIG. 10c. There is a fixed phase displacement of $\delta$ between the voltage waveforms in FIGS. 10b and 10c, and two independent circuits similar to FIG. 9 may be used together with suitable threshold circuits to convert the waveforms of FIGS. 10b and c into the square waves of FIGS. 10d and e respectively. While FIG. 10a shows one possible embodiment, it should be realized that a fixed phase relationship of $\frac{1}{4}\lambda$ exists between the output signals in FIGS. 10d and e if the separation between the first section of the second array and the second section of the first array $\delta$ is $$\delta = \left( \frac{2m+1}{4} \right) \lambda \quad (5)$$

where m is zero or any suitable positive integer. By combining the signals in FIGS. 10d and e logically in an Exclusive-OR gate, the waveform of FIG. 10f is obtained which provides double the resolution for the encoder.

Figure 11:
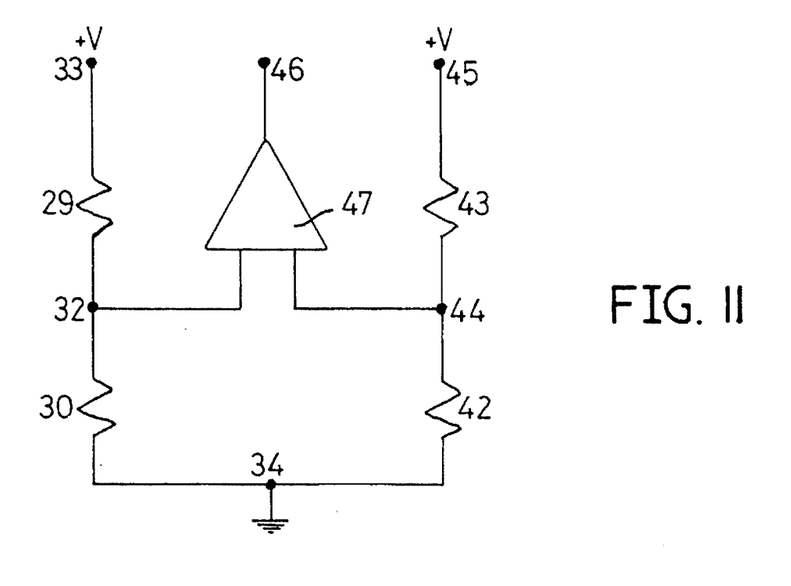
FIG. 11 schematically illustrates circuitry that may be employed with the embodiment of the present invention shown on FIG. 10.

FIG. 11 shows an alternative signal sensing and conditioning circuit for use with the MR arrays of FIG. 10a in producing an output voltage signal at its output terminal 46 each time a magnetic pole is sensed by the MR arrays. This circuit employs a comparator module 47 including an operational amplifier which has a pair of signal input terminals: one input terminal is connected to the common terminal 32 between the two MR sections 29 and 30 of the MR array 28 and the other input terminal is connected to the common terminal 44 between the two MR sections 42 and 43 of the MR array 41 in accordance with the invention. Operation of the circuit of FIG. 11 is best explained if the voltage waveforms $v_A$ and $v_B$ of FIG. 10b and c which have peak excursions of $V_s$ from their selected reference values are considered to be represented only by the fundamental term in a sinusoidal series for the relative displacement $\theta$, and noting that $\lambda = 2\pi$, $$v_A = \frac{V}{2} + V_s \sin\theta \quad (6)$$

$$v_B = \frac{V}{2} + V_s \sin\left( \theta - \frac{2\pi\delta}{\lambda} \right) \quad (7)$$

These two signals are combined in the comparator 47 to produce an output voltage signal at its output terminal 46 of $$v_B - v_A = V_s \left[ \sin\left( \theta - \frac{2\pi\delta}{\lambda} \right) - \sin\theta \right] \quad (8)$$

which is equivalent to $$v_A - v_B = 2V_s \sin\left( \frac{\pi\delta}{\lambda} \right) \sin\left( \theta - \frac{\pi\delta}{\lambda} \right) \quad (9)$$

One common use of the circuit in FIG. 11 is to set the separation $\delta$ equal to one half of the pole pitch, $\frac{1}{2}\lambda$, in which case the signal at the output terminal 46 is $$v_A - v_B = 2V_s \sin\left( \theta - \frac{\pi}{2} \right) \quad (10)$$

It is apparent from this expression that one benefit of using the alternative circuit of FIG. 11 is that the output voltage signal achieves twice the excursion that it obtained from the selected reference values using the circuit of FIG. 9. Another common use of the circuit of FIG. 11 is to set the separation $\delta = \frac{5}{8}\lambda$, in which case the signal at the output terminal 46 is $$v_A - v_B \simeq 1.85\, V_s \sin\left( \theta - \frac{5\pi}{8} \right) \quad (11)$$

Figure 12:
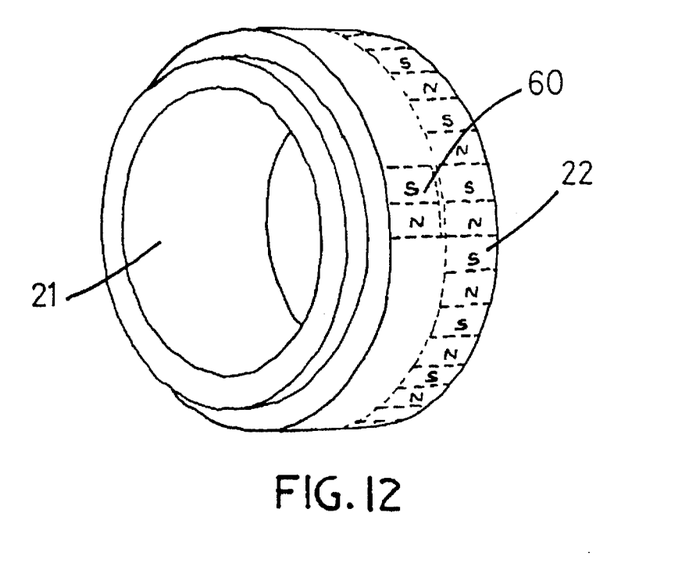
FIG. 12 is an isometric view of an encoder wheel according to the present invention, magnetized to provide a marker pulse.

A separation of $\delta = \frac{5}{8}\lambda$ is most frequently employed when more than two MR arrays are used on the single insulative substrate, the number of adjacent MR sections such as 29, 30, 42 and 43 of FIG. 10a being extended with a spacing progression such as $\gamma, \delta, \gamma, \delta, \gamma, \delta, \gamma \ldots$ Many practical position encoders are also required to output an index marker channel, either in the form of a single voltage impulse for each complete 360° rotation of the encoder wheel, or as two equi-spaced voltage impulses per revolution of the wheel each corresponding to 180° rotation of the wheel, or as four equi-spaced voltage impulses per revolution of the wheel each corresponding to 90° rotation of the wheel, and so on. Such an index marker channel requires that a separate track be recorded on the outer cylindrical surface of the encoder wheel 21 as shown in FIG. 12, because each voltage impulse will be derived from a single adjacent North-South pole pair 60 which is isolated magnetically from all other poles on this or other tracks 22 on the encoder wheel. The single pole pair 60 is magnetized with a pitch $\lambda$ in the same manner described with reference to FIG. 7a using a recording head 26, except that only a single current pulse of duration T and magnitude $+I_m$ is used. If another pole pair is required for another voltage impulse at an angular position disposed at an angle such as 90° or 180° from the first pole pair, then the recording head is excited with another current pulse of duration $\tau$ and magnitude $+I_m$ when the angular rotation of the wheel corresponds to that position. The addition of an index marker channel can be achieved very economically in the magnetic position encoder of this invention by simply securing additional MR arrays to the same insulative substrate that carries the MR arrays used for the incremental channels, except that the index MR arrays are in a location to interact only with the corresponding index track of the encoder wheel.

Figure 13A:
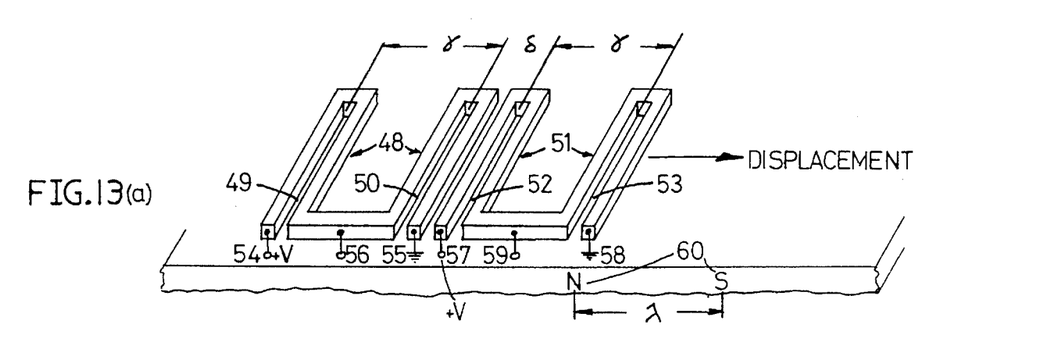
FIG. 13a is a fragmentary, schematic/isometric view showing an MR position sensor for use with the encoder wheel of FIG. 12.

FIG. 13a shows two adjacent MR arrays 48 and 51 which interact with a North-South pole pair 60 to produce voltage impulses for an index marker channel in accordance with this invention. The first MR array 48 has first and second sections 49 and 50 which are separated by a distance $\gamma$ and the second MR array 51 has first and second sections 52 and 53 which are separated by the same distance $\gamma$7. While selection of the distance $\gamma$ is not critical to the generation of voltage impulses, the greatest magnitude of these impulses will be achieved if the value of $\gamma$ is close to that of the pole pitch $\lambda$. The first section 52 of the second MR array is separated by a distance $\delta$ from the second section 50 of the first MR array, which distance $\delta$ is made as small as possible and typically such that the separation between the closest adjacent elements of the sections 50 and 52 is only equal to the width w of those elements. One particular embodiment is for each of the sections 49, 50, 52 and 53 to combine two MR elements, and all of the MR elements in each of the sections are at a fixed distance above the surface of the wheel which is no greater than $0.4 \times \lambda$. In this embodiment, the four adjacent elements of the neighboring sections 50 and 52 have an apparent width of 7w as preferred in this invention. A constant d.c. voltage +V is applied across the first array at its terminals 54 and 55 and across the second array at its terminals 57 and 58. Thus, the interconnection of the MR arrays used for the index marker channel differs from those for the incremental channels in that the inner adjacent terminals of the arrays 55 and 57 are connected to opposite ends of the voltage supply.

Figure 13B:
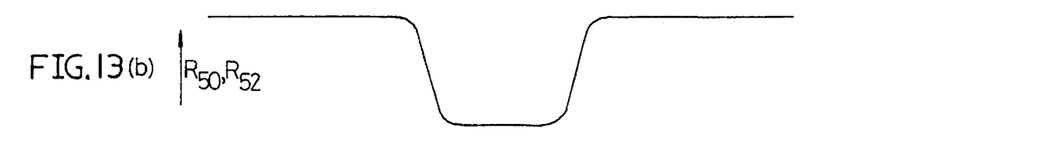
Figure 13C:
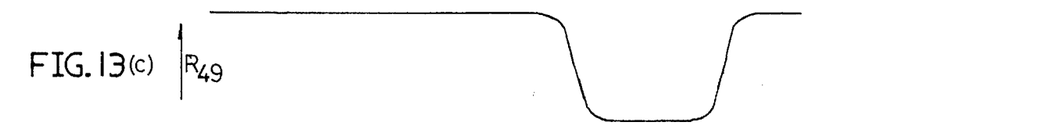
Figure 13D:
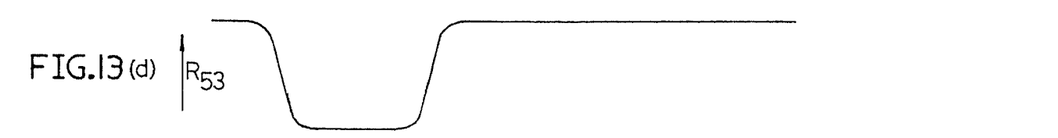
Figure 13E:
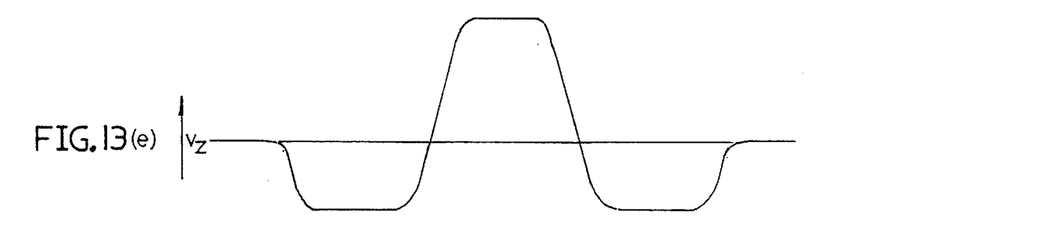
Figure 13F:
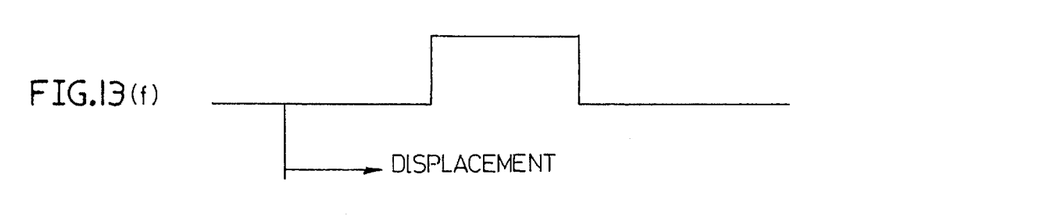
Figure 14:
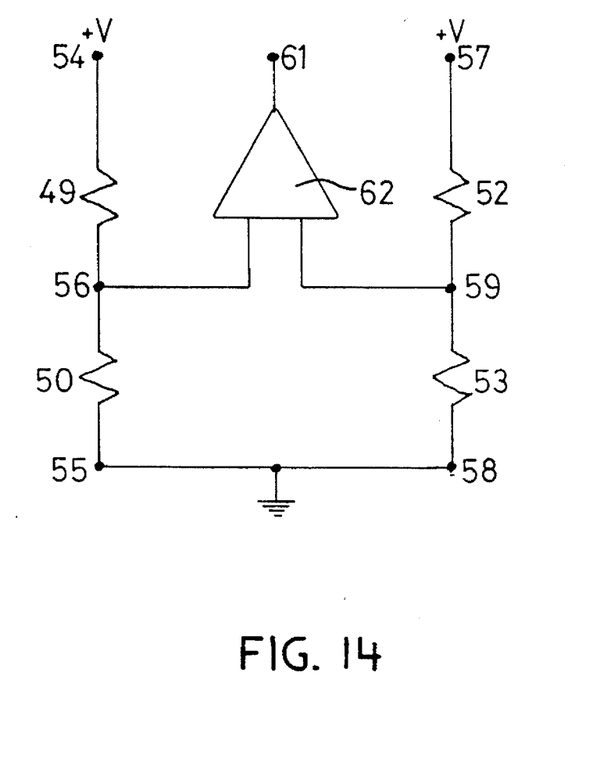

When the MR arrays 48 and 51 move at a constant height above the encoder wheel in a direction perpendicular to the pole edges, the relative displacement causes the total resistances of the MR sections 50 and 52 to vary as shown in FIG. 13b and the resistances of sections 49 and 53 to vary as shown in FIGS. 13c and d respectively. The very close proximity of sections 50 and 52 lends to the assumption that their resistance changes are approximately synchronized as shown in FIG. 13b. FIG. 14 shows a signal sensing and conditioning circuit for use with the MR arrays of FIG. 13a in producing an output voltage signal at its output terminal 61 each time a North-South pole pair is sensed by the MR arrays. This circuit employs a comparator module 62 including an operational amplifier which has a pair of signal input terminals: one input terminal is connected to the common terminal 56 between the two MR sections 49 and 50 and the other input terminal is connected to the common input terminal 59 between the two MR sections 52 and 53 in accordance with the invention. The relative displacement causes the voltage $v_z$ at the output terminal 61 to vary about its selected reference value as shown in FIG. 13e, and the circuit of FIG. 14 may be used together with a suitable threshold circuit to convert the waveform of FIG. 13e into the voltage impulse shown in FIG. 13f corresponding to an index marker. Selecting a value of $\gamma$ which is close to that of the pole pitch $\lambda$ in accordance with this invention ensures that a high rate of change of voltage $v_z$ is achieved at the two transitions with the selected reference value, which in turn makes the selection of the width of the voltage impulse using the threshold circuit more predictable and repeatable.

This invention has been described with one or two MR arrays to provide various incremental and index marker channels, but it is obvious that it can be extended to many MR arrays using the disclosed techniques all of which are secured to a single insulative substrate to provide a multitude of channels in conjunction with several recorded tracks on the encoder wheel, and that the voltage supply and common terminals for all of the MR arrays can be brought to a convenient location on one side of the substrate for interconnection to the signal sensing and conditioning circuit via wide conductors of the sputtered MR material which have widths much greater than the pole pitch $\lambda$ such that their resistances are very small and change unnoticeably in the presence of the magnetic fields from the encoder wheel.

This invention has also been described with a serpentine shape for the MR elements in the sections of the MR arrays, but it is obvious that various odd or even numbers of elements can be used to form each serpentine section provided that the effective width of the section is very much greater than the thickness of the sputtered MR material such that the section resembles a very large, thin plate, and provided that the effective width of each section is somewhat smaller than the pole pitch $\lambda$ so that the section experiences a rotating applied magnetic field as the encoder wheel rotates.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A magnetoresistive (MR) position sensor, comprising:

(a) a rotatable cylindrical encoder wheel having plurality of alternating N and S magnetic poles spaced a constant pole pitch around the circumferential surface of said encoder wheel, adjacent ones of said N and S poles having interfacing edges parallel to the axis of rotation of said encoder wheel, and material in which said N and S magnetic poles are formed extending a distance greater than about 0.5 times said pole pitch below said circumferential surface;

(b) a first MR sensing array disposed on an insulative substrate in proximity to said circumferential surface of said encoder wheel, at a distance less than about 0.4 times said pole pitch from said circumferential surface, such as to sense rotating magnetic fields produced by said N and S poles as they pass said first MR sensing array as said encoder wheel rotates, said first MR sensing array including at least a first section comprising at least two legs extending parallel to said interfacing edges, said at least two legs being joined in series so as to form a serpentine shape, and wherein all said legs of said first section are together periodically under the influence of a single one of said N and S magnetic poles as said encoder wheel rotates; and (c) means to apply a constant DC voltage across terminal ends of said serpentine shape.

2. A magnetoresistive (MR) position sensor, as defined in claim 1, wherein:

(a) said rotating magnetic fields are of approximately constant magnitude; and (b) the effective width of said serpentine shape is much greater than the thickness thereof, such that said rotating magnetic fields may penetrate said first MR sensing array when said magnetic fields are parallel to the plane of said first MR sensing array, but said magnetic fields are excluded therefrom when said magnetic fields are oriented perpendicular to said plane.

3. A magnetoresistive (MR) sensor, as defined in claim 1, wherein said at least a first section of said first MR array includes four legs parallel to said interfacing edges and joined in series so as to form a serpentine shape.

4. A magnetoresistive (MR) sensor, as defined in claim 1, wherein said first MR array includes a second section identical to said first section, the centers of said first and second second sections being spaced apart a distance approximately equal to said pole pitch times $(2n+1)/2$, where n is zero or a positive integer, said first and second sections being electrically connected in series to receive said constant DC voltage across terminals at distal ends of said first and second sections, and said first and second sections having a common terminal at the intersection of said first and second sections.

5. A magnetoresistive (MR) sensor, as defined in claim 4, further comprising a second MR array identical to said first MR array and electrically connected in series therewith, said constant DC voltage being applied between a terminal at the interconnection of said first and second MR arrays and terminals at distal ends of said first and second MR arrays, the centers of adjacent said sections of said first and second arrays being spaced apart a distance equal to said pole pitch times $(2m+1)/4$, where m is zero or an integer.

* * * * *

UNITED STATES PATENT AND TRADEMARK OFFICE
CERTIFICATE OF CORRECTION

PATENT NO. : 5,545,985
DATED : August 13, 1996
INVENTOR(S) : Peter Campbell

It is certified that error appears in the above-indentified patent and that said Letters Patent is hereby corrected as shown below:

Title page, item [54] and col. 1, line 4,
The title is corrected to read:

---MAGNETORESISTIVE POSITION SENSOR INCLUDING AN ENCODER WHEEL

WHEREIN THE MAGNETIZATION EXTENDS GREATER THAN ABOUT 0.5

TIMES THE POLE PITCH BELOW THE SURFACE---

Signed and Sealed this

Twenty-sixth Day of November 1996

Attest:

BRUCE LEHMAN

Attesting Officer

Commissioner of Patents and Trademarks